Figure 1:
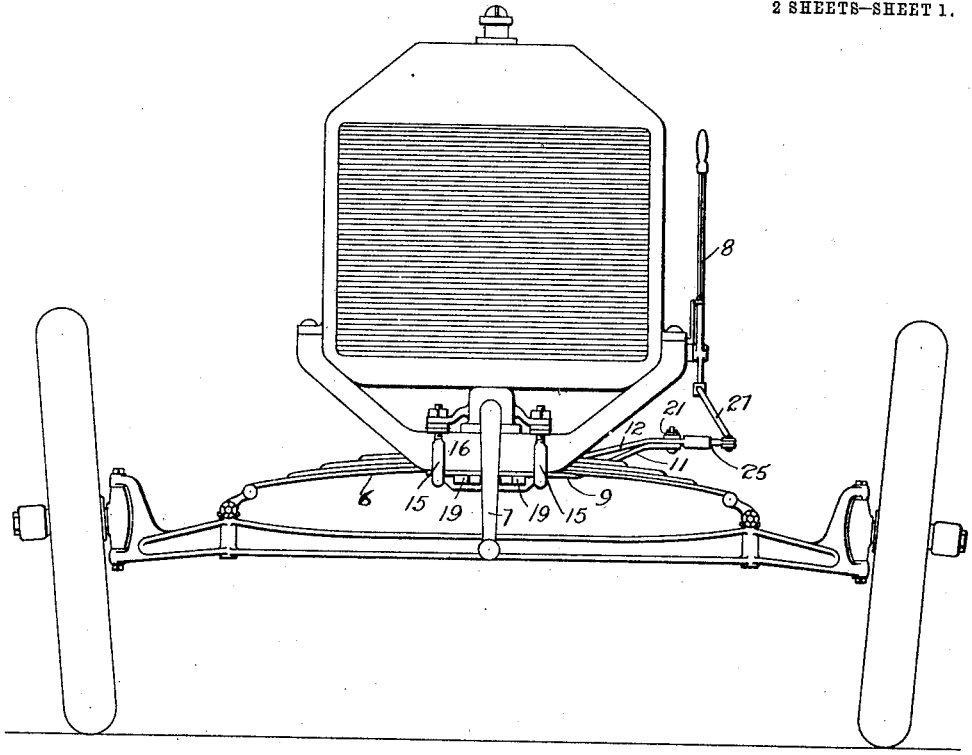

A. J. ZLOTORZYNSKI.
SAFETY CRANKING DEVICE FOR AUTOMOBILES.
APPLICATION FILED MAR. 31, 1913.

1,107,007.

Patented Aug. 11, 1914.
2 SHEETS—SHEET 1.

WITNESSES
G. Robert Thomas
E. B. Marshall

INVENTOR
Alexander J. Zlotorzynski
BY Munn & Co
ATTORNEYS

A. J. ZLOTORZYNSKI.
SAFETY CRANKING DEVICE FOR AUTOMOBILES.
APPLICATION FILED MAR. 31, 1913.
1,107,007.
Patented Aug. 11, 1914.
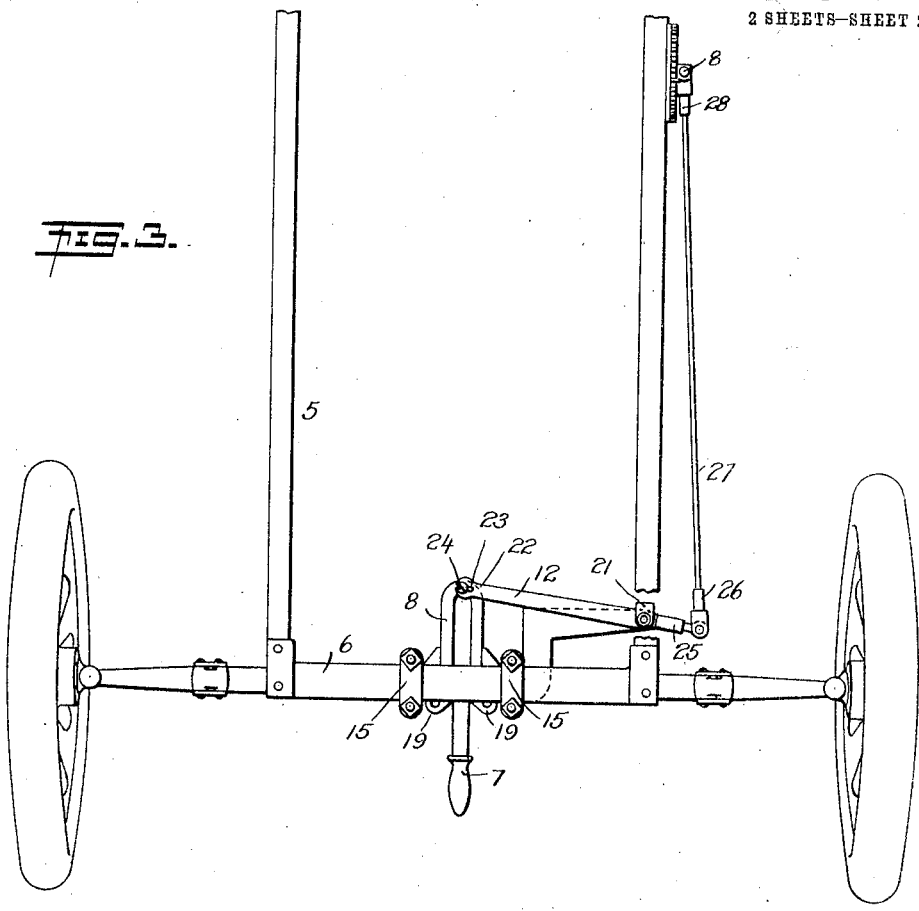
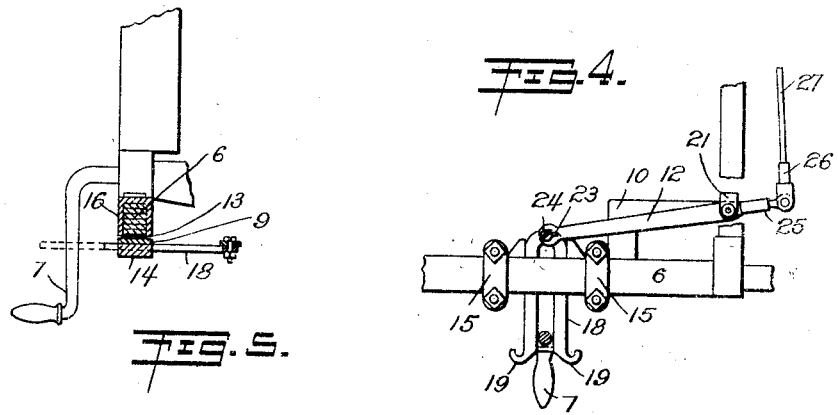
WITNESSES
G. Robert Thomas
E. B. Marshall
INVENTOR
Alexander J. Zlotorzynski
BY Munn & Co
ATTORNEYS

UNITED STATES PATENT OFFICE.

ALEXANDER J. ZLOTORZYNSKI, OF SHAMOKIN, PENNSYLVANIA.

SAFETY CRANKING DEVICE FOR AUTOMOBILES.

1,107,007. Specification of Letters Patent. Patented Aug. 11, 1914.

Application filed March 31, 1913. Serial No. 757,886.

*To all whom it may concern:*

Be it known that I, ALEXANDER J. ZLOTORZYNSKI, a citizen of the United States, and a resident of Shamokin, in the county of Northumberland and State of Pennsylvania, have invented a new and Improved Safety Cranking Device for Automobiles, of which the following is a full, clear, and exact description.

My invention has for its object to provide a safety cranking device for automobiles, which has a U-shaped member for engaging the crank, the U-shaped member being connected by a lever and rod with the clutch lever of the automobile. When the clutch lever is in neutral position the U-shaped member is held out of engagement with the crank but the movement of the clutch member into operative position, throws the U-shaped member by means of the first lever and the rod into position to embrace the crank and prevent its rotation.

Additional objects of the invention will appear in the following complete specification, in which the preferred form of the invention is disclosed.

In the drawings similar characters of reference indicate corresponding parts in all the views, in which—

Figure 2:
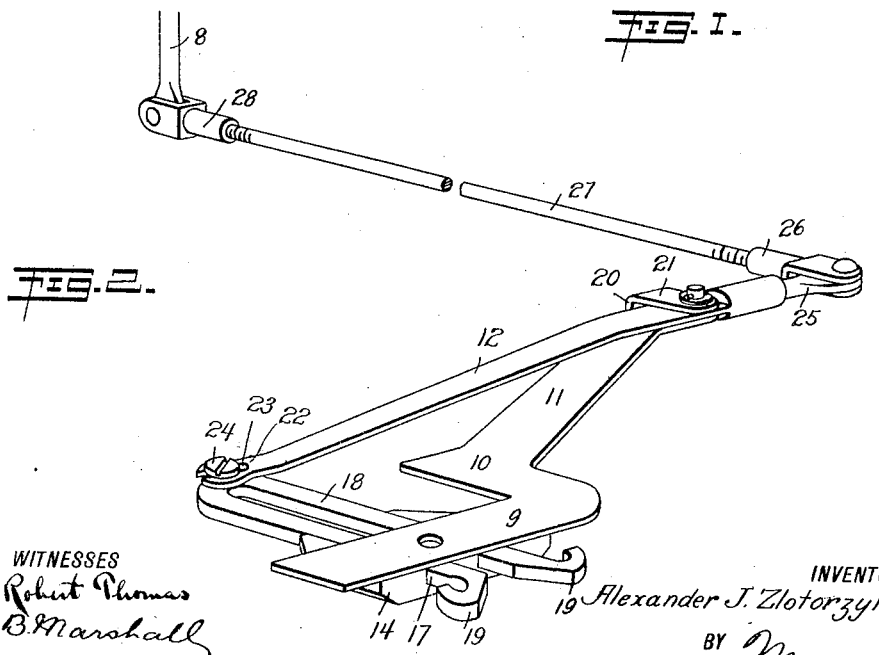

Figure 1 is a view showing a front elevation of an automobile, to which my invention is applied; Fig. 2 is a perspective view showing my improvement; Fig. 3 is a plan view of a portion of the chassis of a car showing my improvement; Fig. 4 is a view showing the U-shaped member as it appears in Fig. 3, but with the lever thrown to move the U-shaped member to a position where it embraces the crank; and Fig. 5 is a transverse sectional view of the axle and the U-shaped member shown in Fig. 3.

By referring to the drawings it will be seen that the automobile chassis 5 has a spring 6, a crank 7 and a clutch lever 8, my improvement consisting of the bracket 9 with the offset portion 10, this offset portion having the obliquely extending arm 11, which serves as a fulcrum for the lever 12. This bracket 9 is disposed below the spring 6, as shown in the drawings, but as indicated in Fig. 5, I prefer to dispose between the bracket 9 and the spring 6, a piece of cloth or other non-metallic member 13. Below the bracket 9 there is disposed a block 14, the bracket 9 and the block 14 being secured in place by means of the straps 15, which are disposed around the bracket 9, the block 14 and the member 16, which is disposed at the top and sides of the spring 6. By this means the bracket 9 and the block 14 are held in position. This block 14 has a guideway 17, in which is disposed the U-shaped member 18, this U-shaped member 18 having its ends 19 extending forwardly, so that they are adapted to embrace the crank 7 of the automobile. The inner sides of the ends 19 of the U-shaped member 18 diverge outwardly, as best shown in Fig. 2 of the drawings. The end 20 of the arm 11 of the bracket 9 is turned to form the U-shaped member 21, in which is fulcrumed the lever 12, the terminal 22 of this lever 12 having a slot 23, in which is disposed a screw 24, the screw 24 being secured to the central portion of the U-shaped member 18. To the other terminal 25 of the lever 12, there is articulated the terminal 26 of the rod 27, this rod 27 having another terminal 28, which is articulated to the clutch lever 8. It will therefore be seen that the parts of my improvement may be constructed at very little expense, and with little difficulty they may be mounted on several types of automobiles which are now in use.

When the clutch lever 8 is in neutral or inoperative position, the rod 27 is moved forward to move the terminal 22 of the lever 12 rearwardly, so that the U-shaped member 18 will be drawn backward out of engagement with the crank 7. However, when the lever 8 is thrown into operative position, it will draw the rod 27 rearwardly, thereby moving the terminal 22 of the lever 12 forward thus throwing the U-shaped member 18 into a position where it will embrace the crank 7.

Having thus described my invention, I claim as new and desire to secure by Letters Patent:

1. In combination with an automobile having a spring, a lever, and a crank, a bracket, a block disposed below the bracket, and having a guideway, the bracket and the block being secured relatively to the spring, a lever fulcrumed to the bracket, a U-shaped member disposed in the guideway and adapted to embrace the crank, one of the arms of the lever being connected with the U-shaped member, and a rod connecting the second lever with the first lever, for operating the former.

2. In combination with an automobile having a spring, a lever and a crank, a block having a guideway disposed adjacent the spring, a bracket disposed against the block, straps for holding the block and the bracket in position, a lever fulcrumed to the bracket, a U-shaped member disposed in the guideway, and adapted to embrace the crank, one of the arms of the lever being connected with the central portion of the U-shaped member, and a rod connecting the second lever with the first lever for operating the former.

3. In combination with an automobile having a lever and a crank, a bracket having an offset portion and an arm extending obliquely from the offset portion, a block having a guideway, means for holding the bracket and the block relatively to the automobile, a U-shaped member slidably mounted in the guideway of the block, a lever fulcrumed to the arm of the bracket and having one terminal connected with the U-shaped member, and a rod secured at one terminal to one of the levers, and at the other terminal to the other lever.

In testimony whereof I have signed my name to this specification in the presence of two subscribing witnesses.

ALEXANDER J. ZLOTORZYNSKI.

Witnesses:
PAUL FRENDRICK,
CHARLES E. HUGHES.